Figure 1:
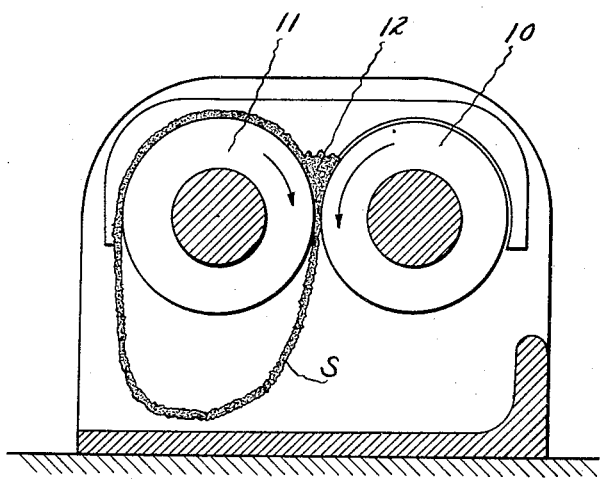

April 21, 1931.    C. E. MAYNARD    1,802,119

METHOD OF BREAKING DOWN RUBBER

Filed Jan. 6, 1927

INVENTOR.
Charles Edgar Maynard
BY
Edward C. Taylor
ATTORNEY.

Patented Apr. 21, 1931

1,802,119

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

METHOD OF BREAKING DOWN RUBBER

Application filed January 6, 1927. Serial No. 159,368.

This invention relates to the working of unvulcanized rubber, and has for a particular object the improvement of methods now known for breaking down crude rubber preparatory to mixing other ingredients with it.

Crude rubber before being worked is of a dry, springy, character that will not receive compounding ingredients nor form sheets when passed between calender rolls. In order to bring the rubber into condition to be compounded and sheeted it is necessary to subject it to what is known as "breaking down", an operation in which the rubber is made more plastic and tacky. Breaking down can be done in inclosed mixing machines, but is generally carried out upon so-called "mills", consisting of two long cylindrical rolls mounted just out of contact and revolved at different speeds in opposite directions. It is to the latter method of breaking down that my invention relates.

The common method of operating a rubber mill requires the constant attendance of one operator. A batch of rubber is placed between the rotating mill rolls, which tear it apart and squeeze the pieces through the bite of the rolls. As the operator sweeps up these pieces and again feeds them through the rolls the rubber gradually attains a cohesive character so that it hangs together in the form of a sheet extending completely around one of the rolls. Where the sheet enters into the bite of the rolls it merges into a large "bank" or mass of rubber riding in the V-shaped space between the rolls and forming what may be called a floating bank. In order to cause the rubber contained in the bank to undergo its share of breaking down and to blend the whole mass together, the operator cuts the sheet repeatedly on slanting lines starting from one edge, rolls up the rubber thus freed, and finally allows it to again enter the bite of the roll. A photograph of this step is reproduced at page 117 of Pearson's book on Pneumatic Tires (New York, 1922). After the rubber has been thoroughly broken down and blended, these operations being joined in one step according to the standard method, the rubber is cut off the roll into slabs and stored or is mixed, conveniently on the same mill, with the desired compounding ingredients.

I have found that the labor of breaking down rubber can be decreased by a separation of the breaking down and blending operations, either upon a succession of mills through which the rubber is fed as a continuous sheet or, preferably, upon a single mill. According to my improved method the labor is decreased to a point where one man can tend two mills instead of one as in the prior methods.

Figure 2:
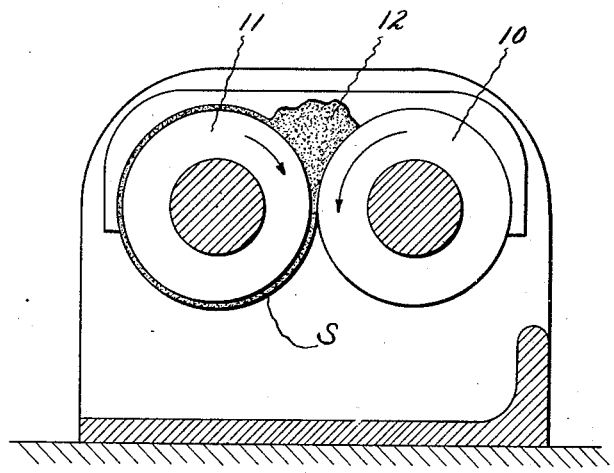

My invention will now be described with reference to the accompanying drawings, in which Fig. 1 is a diagrammatic section of a mill showing the breaking down stage of my method; and Fig. 2 is a similar view showing the blending stage.

In the practice of the preferred embodiment of my method the operator feeds the rubber stock S into the bite of the mill rolls 10 and 11, picking up the pieces and re-feeding them until a cohesive sheet passing around one roll is formed. The amount of rubber used is so regulated that the bank of rubber 12 is initially small enough to be rolled over and over by the motion of the stock instead of floating between the rolls. The natural tendency of the rubber sheet in this stage is to hang loosely around the mill roll as in Fig. 1.

The mill and stock are now left alone, freeing the operator for work upon another mill, for a period varying with the stock but of the order of about ten minutes. At about this time the rubber has become thoroughly broken down, and develops a contractive tendency which draws the sheet tightly against the mill roll as in Fig. 2 and increases the size of the bank to the point where it floats instead of rolls. This serves as a signal to the operator that the breaking down period is over, and he returns to the mill, cutting and folding the stock until the desired amount of blending has been done. Only about three minutes is required for this, totaling, with the time for starting the rubber, about five minutes as against ten minutes in which the mill functions purely automatically. It will be seen that ample time is given for the operator to handle two mills, whereas with the old practice he was fully engaged with one.

Having thus described my invention, I claim:

The method of breaking down rubber stock which comprises passing stock through mill rolls until it forms a cohesive sheet, regulating the amount of stock so that it forms in its initial stages a rolling bank between the rolls, allowing the sheet to pass through the mill rolls and to loop loosely and freely around one of them, permitting the stock to travel undisturbed in said loop formation until it is broken down and of itself contracts upon the roll due to its changed constituency, and finally cutting and folding the stock to blend it.

CHARLES EDGAR MAYNARD.